United States Patent [19]
Kanno et al.

[11] Patent Number: 5,167,573
[45] Date of Patent: Dec. 1, 1992

[54] PRELIMINARY VENTILATION DEVICE FOR VEHICLES

[75] Inventors: Yoshihisa Kanno; Shinshi Kajimoto, both of Hiroshima; Masayuki Jinno, Higashihiroshima; Akihiro Furuzawa, Kure, all of Japan

[73] Assignees: NALDEC Corporation; Mazda Motor Corporation, both of Hiroshima, Japan

[21] Appl. No.: 797,921

[22] Filed: Nov. 26, 1991

[51] Int. Cl.⁵ .............................................. B60H 1/26
[52] U.S. Cl. ................................. 454/164; 454/141; 454/900; 62/235.1
[58] Field of Search .................. 454/75, 141, 162, 164, 454/165, 900; 62/235.1

[56] References Cited

U.S. PATENT DOCUMENTS

| 4,804,140 | 2/1989 | Cantrell | 454/141 X |
| 5,040,455 | 8/1991 | Doi | 454/900 X |

FOREIGN PATENT DOCUMENTS 59-51451 12/1984 Japan .
1-172016 7/1989 Japan .

Primary Examiner—Robert G. Nilson

[57] ABSTRACT

In a vehicle incorporating a control device connected to a solar battery, a storage battery, an operation unit and a ventilation unit, a preliminary ventilating device is set to either of charging mode in which the storage battery is charged from the solar battery, forced exhaust mode in which the ventilation unit is driven by power supplied from the storage battery, and in parking ventilating mode in which the ventilation unit is driven by an electromotive force supplied from the solar battery. Charging of the storage battery from the solar battery is possible even when the charging is controlled on the basis of the results of the measurement of the open-circuit voltage of the solar battery. When the solar battery exhibiting a voltage current curve lower than the reference curve is used, the ventilating fan can be activated before the amount of sunlight received by the solar battery has been maximized.

16 Claims, 16 Drawing Sheets

| OPERATION SWITCH 2 | ON | | OFF | | | | |
|---|---|---|---|---|---|---|---|
| | FORCED VENTILATION IS ON | | | | PARKING VENTILATION IS ON | | |
| IG SWITCH 8 | ON | NOT ON | ON | NOT ON | KEY IS INSERTED | KEY IS REMOVED | |
| TEMPERATURE OF OUTDOOR | | | | | | ≤ 7°C | 7~15°C ≥ 15°C |
| POWER SOURCE TIMER | — | | — | FORCED VENTILATION FOR TEN MINUTES AFTER ON | — | | |
| MODE | FORCED VENTILATION | CHARGING | FORCED VENTILATION | FORCED VENTILATION | CHARGING | CHARGING OR PARKING VENTILATION | PARKING VENTILATION |

FIG. 6

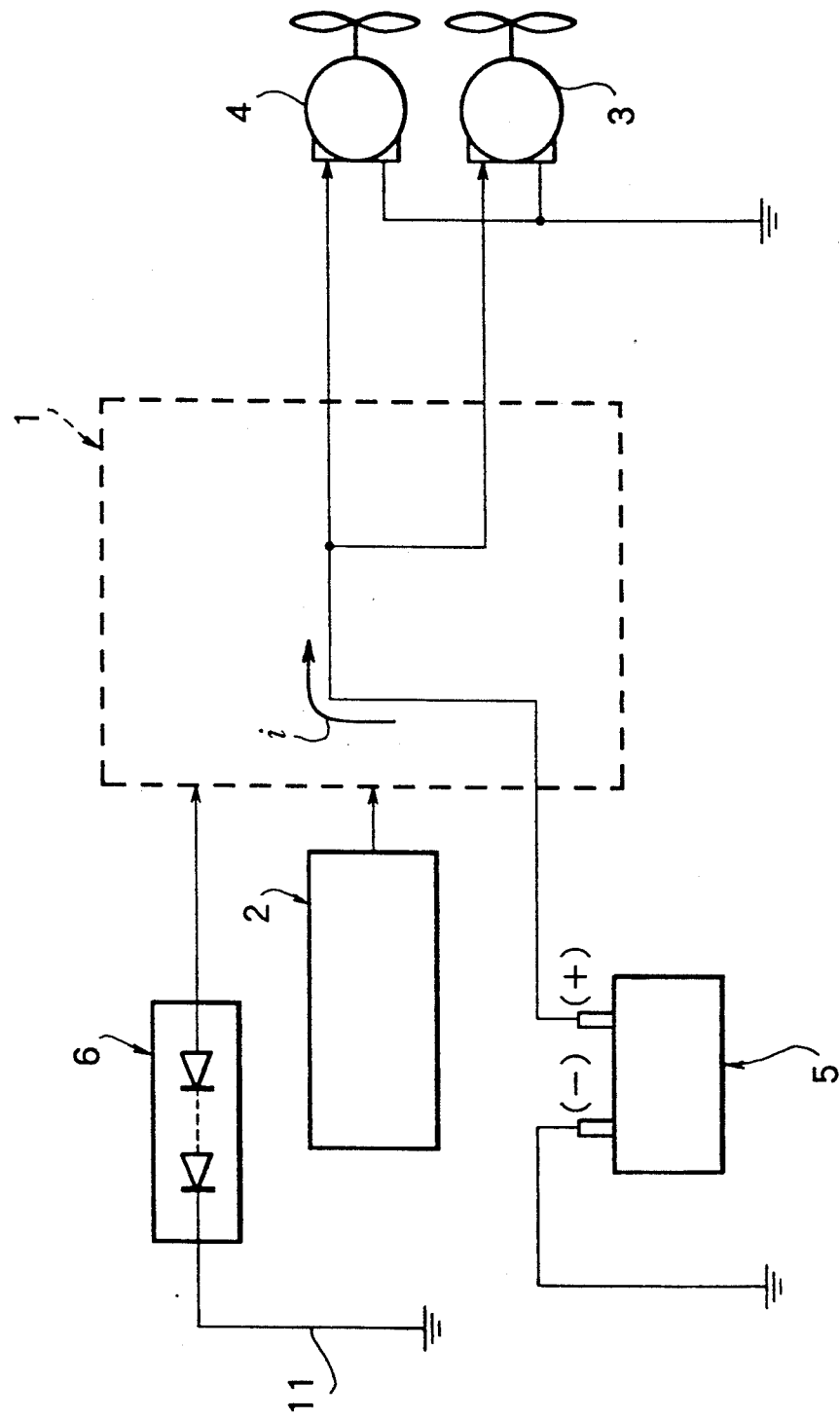

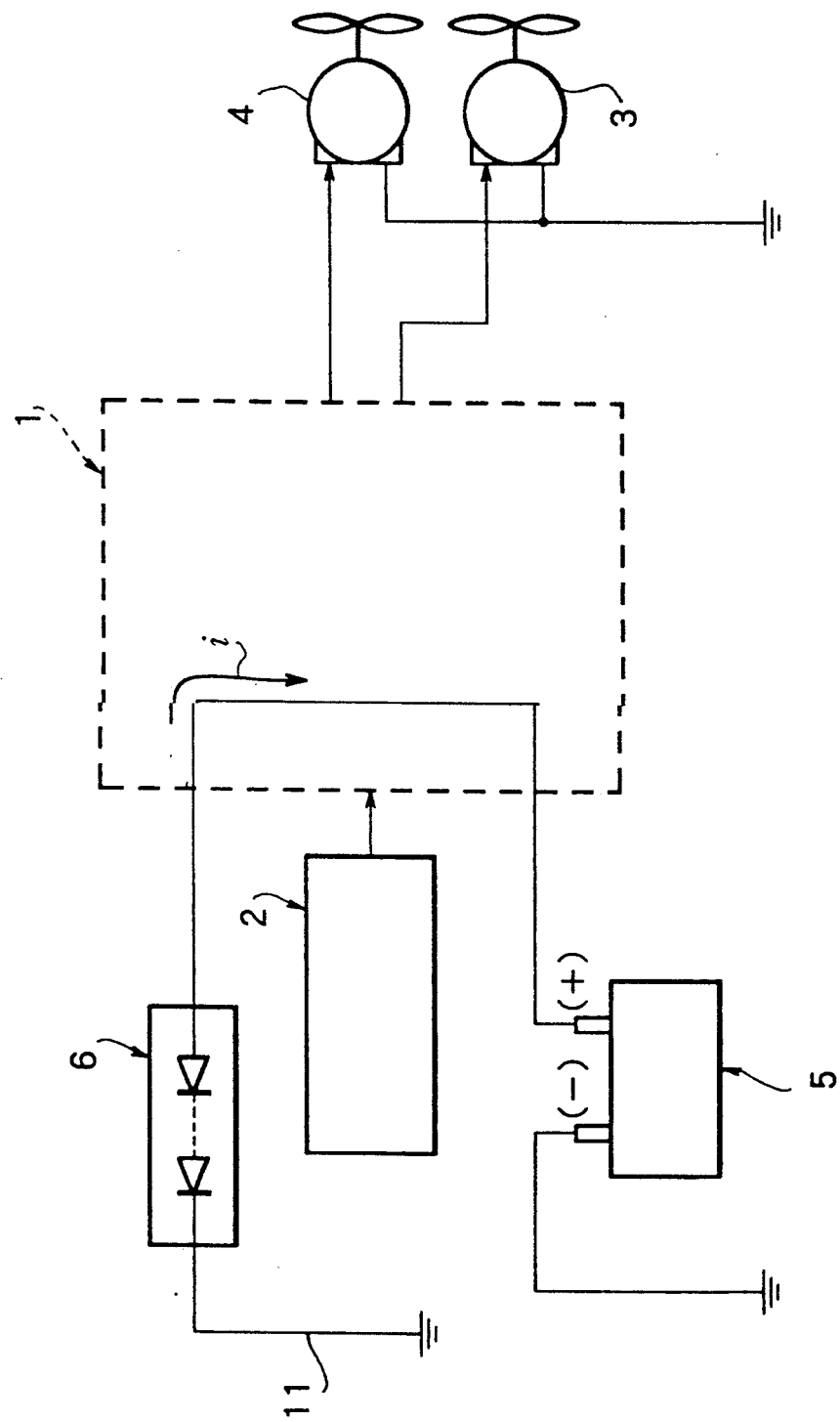
F I G. 7C

PRELIMINARY VENTILATION DEVICE FOR VEHICLES

BACKGROUND OF THE INVENTION

The present invention relates to a preliminary ventilating device for vehicles which employs, for example, solar battery and storage battery which are used as an auxiliary and a main power sources, respectively.

Japanese Patent Publication No. 51451/1984 discloses a vehicle in which parking ventilation is performed, i.e., the interior thereof is ventilated while the vehicle is parked, by a ventilation fan serving as ventilation means which is driven by the electromotive force from a solar battery. In such a vehicle which employs a solar battery, the power generated by the solar battery is efficiently used as a power source for charging the vehicle's storage battery while the vehicle's engine is operating and, hence, a dynamo thereof is generating a sufficient amount of power, or when the temperature of the outdoor is low and, hence, the aforementioned parking ventilation is not necessary.

Japanese Patent Laid-Open No. 172016 discloses a ventilation systm for vehicles to eliminate an excessive increase in the temperature of the interior of the vehicle which occurs when the vehicle has been parked for a long time under a scorching sun in summer time, because it makes a driver or passenger uncomfortable when they get in the vehicle and it takes some time for an air conditioner to lower the temperature to a comofortable level. In Japanese Patent Laid-Open No. 172016, a ventilation fan, serving as ventilation means, automatically operated when the temperature of the interior of the parked vehicle reaches a predetermined value or above, is provided, and parking ventilation is performed, i.e., the air in the interior of the vehicle is replaced with fresh air, by the operation of such a ventilation fan. This ventilation fan is driven by the solar battery which sends out an output voltage corresponding to the amount of sunlight it receives.

In a vehicle which employs both the chargeable storage battery and the solar cell arrays and in which the storage battery is charged from the solar battery, a switch must be provided to open and close a charging circuit for charging the storage battery, and this switch must be adequately controlled in accordance with changes in the voltage of the storage battery, i.e., in response to the necessity of charging of the storage battery.

More specifically, it is possible to connect the solar battery to the storage battery through the switch, and to control the switch so that it breaks the connection between the solar battery and the storage battery when it is determined that the voltage of the storage battery reaches the reference voltage. However, when the switch is turned off and supply of power from the solar battery is stopped, discharge current of the solar battery does not flow and the open-circuit voltage thereof thereby increases to about 20 volts, which is higher than the voltage of the storage battery which is 12 volts.

When the voltage of the solar battery is measured in its open-circuit state, the increase to about 20 volts in the open-circuit voltage is detected. As a result, even when the storage battery discharges and the voltage thereof thereby drops and charging of the storage battery from the solar battery is thus made possible, the storage battery may not be able to be charged from the solar battery.

In the aforementioned vehicle which employs as the power source of the ventilating fan the solar battery characterized by the generation of a voltage corresponding to the amount of sunlight it receives, when a predetermined amount of sunlight cannot be obtained, the ventilating fan may not be able to be driven. Therefore, it has been proposed to determine whether or not a sufficient amount of power for activating the ventilating fan is sent from the solar battery, and to activate the ventilating fan on the basis of the results of the determination. However, individual solar battery arrays differ greatly from each other in output voltage. Also, a d.c. motor for driving the ventilating fan requires a large current when a relatively low voltage is applied thereto.

Last two factors will now be described in more detail with reference to FIG. 15 which shows the relationship between activation characteristic curve R of a d.c. motor, reference voltage current curve X of a reference solar battery, and voltage current curve Y of an individual solar battery. In FIG. 15, reference voltage current curve X, indicated by the broken line, ensures that all the d.c. motors for the ventilating fans can be activated when the voltage and current of the solar battery are applied to the d.c. motors at a predetermined amount of sunlight. In other words, when the voltage and current of the solar battery are applied, all the d.c. motors can be activated, if the voltage current curve of that solar battery exceeds the lower first peak RA which appears on the activation characteristic curve R. The conventional motor activating method does not cause any problem, if all the solar batteries manufactured exhibit characteristics equivalent to reference voltage current curve X.

However, there exist solar batteries exhibiting voltage current curve Y, which is lower than reference voltage current curve X, at the same amount of sunlight as that assuring reference voltage current curve X. When such a solar battery is used, the d.c. motors cannot be activated, because voltage current curve Y does not exceed the first peak RA of activation characteristic curve R. Hence, it is possible to measure a difference $\Delta V$ between the open-circuit voltage of reference voltage curve curve X and that of voltage current curve Y beforehand and to activate the motors when the amount of sunlight is increased and when voltage current curve Y2, which assures generation of an open-circuit voltage higher than that of reference voltage current curve X by $\Delta V$ and which is higher than the activation characteristic curve R, can thus be obtained.

When the solar battery exhibits voltage current curve Y2, it generates an electromotive force of, for example, 50 mW/cm$^2$ at the maximum amount of sunlight. This means that the solar battery cannot be used in a state where it exhibits voltage current curve Y1 assuring activation of the ventilating fans, indicated by the alternate long and short dash line in FIG. 15, e.g., when it generates an electromotive force which is higher than 30 mW/cm$^2$ by 5 mW/cm$^2$.

In other words, in a solar battery exhibiting voltage current curve Y which is lower than reference voltage current curve X, variations in the voltage are great when the voltage is measured in an open-circuit state, and voltage measurement errors of $\Delta V$ thus occur when the open-circuit voltage thereof is measured in an open-circuit state in which it is not connected to a load. Hence, the motors cannot be activated unless the amount of sunlight received by the solar battery is at a maximum.

SUMMARY OF THE INVENTION

In view of the aforementioned problems of the conventional techniques, a primary object of the present invention is to provide a preliminary ventilating device for vehicles in which a storage battery is charged and a ventilating fan is driven on the basis of the results of the measurement of the open-circuit voltage of a solar battery. In the device, when the voltage of the storage battery drops and charging thereof from the solar battery is thereby made possible and when the open-circuit voltage of the solar battery falls into a chargeable state, the storage battery can be charged from the solar battery on the basis of the results of the measurement of the open-circuit voltage of the solar battery.

A secondary object of the present invention is to provide a preliminary ventilating device for vehicles in which a storage battery is charged and a ventilating fan is driven on the basis of the results of the measurement of the open-circuit voltage of a solar battery. When the solar battery exhibiting a voltage current curve lower than the reference curve is used, the ventilating fan can be activated before the amount of sunlight the solar battery receives has been maximized.

In the preliminary device for vehicles according to the present invention, when the charging mode is set, the storage battery is charged from the solar battery in a state wherein the switch means is closed. When charging is completed, the switch means is opened again. After a predetermined time elapses, the storage battery discharges and charging thereof may become necessary. In that case, the switch is closed and charging is performed. Thereafter, charging of the storage battery from the solar battery is repeated.

When the parking ventilation mode is set, a open-circuit voltage determination means measures the open-circuit voltage of the solar battery which sends out a voltage corresponding to the amount of sunlight it receives, and then a load setting means connects a predetermined load means to the solar battery. Thereafter, the open-circuit voltage of the solar battery is measured at predetermined time intervals which are measured by a second timer means. When it is determined that the open-circuit voltage measured is high enough to activate the ventilation means, power of the solar battery is supplied to the ventilation means to activate it.

Other features and advantages of the invention will be apparent from the following description taken in connection with the accompanying drawings.

BRIEF DESCRIPTION OF THE DRAWINGS

FIG. 6 is a table for operation mode;

FIG. 7B is a block diagram showing forced exhaust mode in the table shown in FIG. 6;

FIG. 7C is a block diagram showing charging mode in the table shown in FIG. 6;

DETAILED DESCRIPTION OF THE PREFERRED EMBODIMENTS

Figure 1:
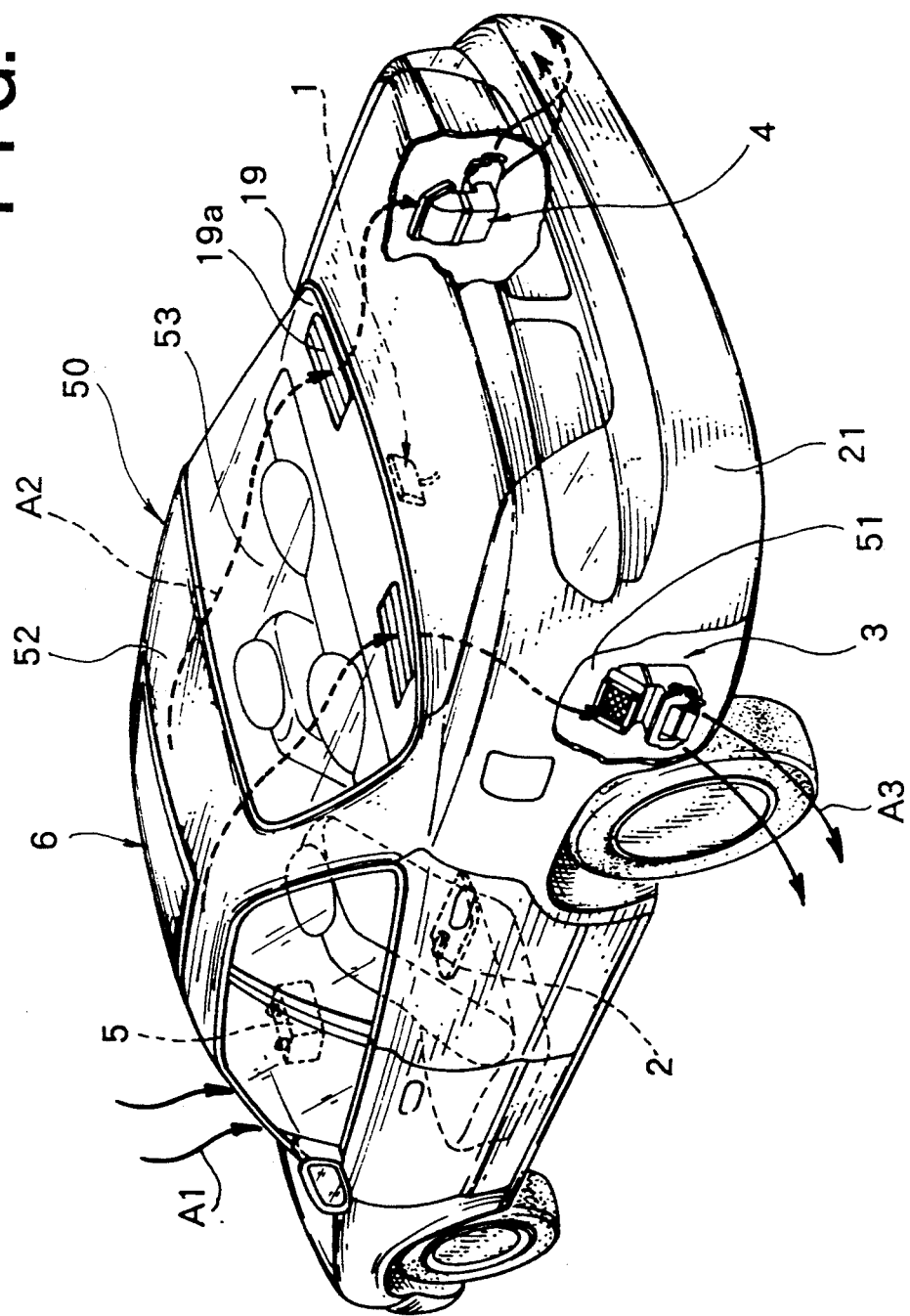
FIG. 1 is a perspective view of a vehicle 50 with a preliminary ventilating device mounted thereon, as seen when looking from the rear and left thereof.

A preferred embodiment of the present invention will now be described with reference to the accompanying drawings. FIG. 1 is an illustration of a passenger car 50 with a preliminary ventilating device mounted thereon, as seen when looking from the left and rear side thereof, partly broken away and the interior thereof being seen through.

In FIG. 1, a known storage battery 5, which is the secondary cells that can be charged and discharged repeatedly, is disposed in an engine compartment in the front portion of the passenger car 50, and a solar battery 6 made of amorphous silicon is disposed on the front portion of a roof 52. The solar battery 6 has the photoelectric conversion function and adequately passes light. It is also used as a window member of a sun roof. In a trunk 51, a first ventilating fan 3 and a second ventilating fan 4 are provided at the two sides thereof. Both the ventilating fans 3 and 4 communicate with a vent 19a in a rear tray 19 via special ventilation passages (not shown), respectively. They are connected to a control device 1 provided in the trunk 51 so that they can be controlled under predetermined conditions. An operation switch 2 operated to select either of the ventilation modes, which will be described later, is provided on an operation panel between a driver's seat and a passenger's seat. The operation switch 2 is connected to the control device 1.

In the preliminary ventilating device arranged in the aforementioned manner, the drive of the first and second ventilation fans 3 and 4 is controlled on the basis of the operation of the operation switch 2 so as to introduce an air A1 from a vent of a ventilation device provided in the front of the passenger car 50 into an passenger compartment 53, to replace a high temperature air A2 in the passenger compartment with the air A1, and then to discharge an exhaust A3 from the vent 19a in the rear tray 19 by the first and second ventilation fans 3 and 4 toward the rear side of a bumper 51.

Figure 2:
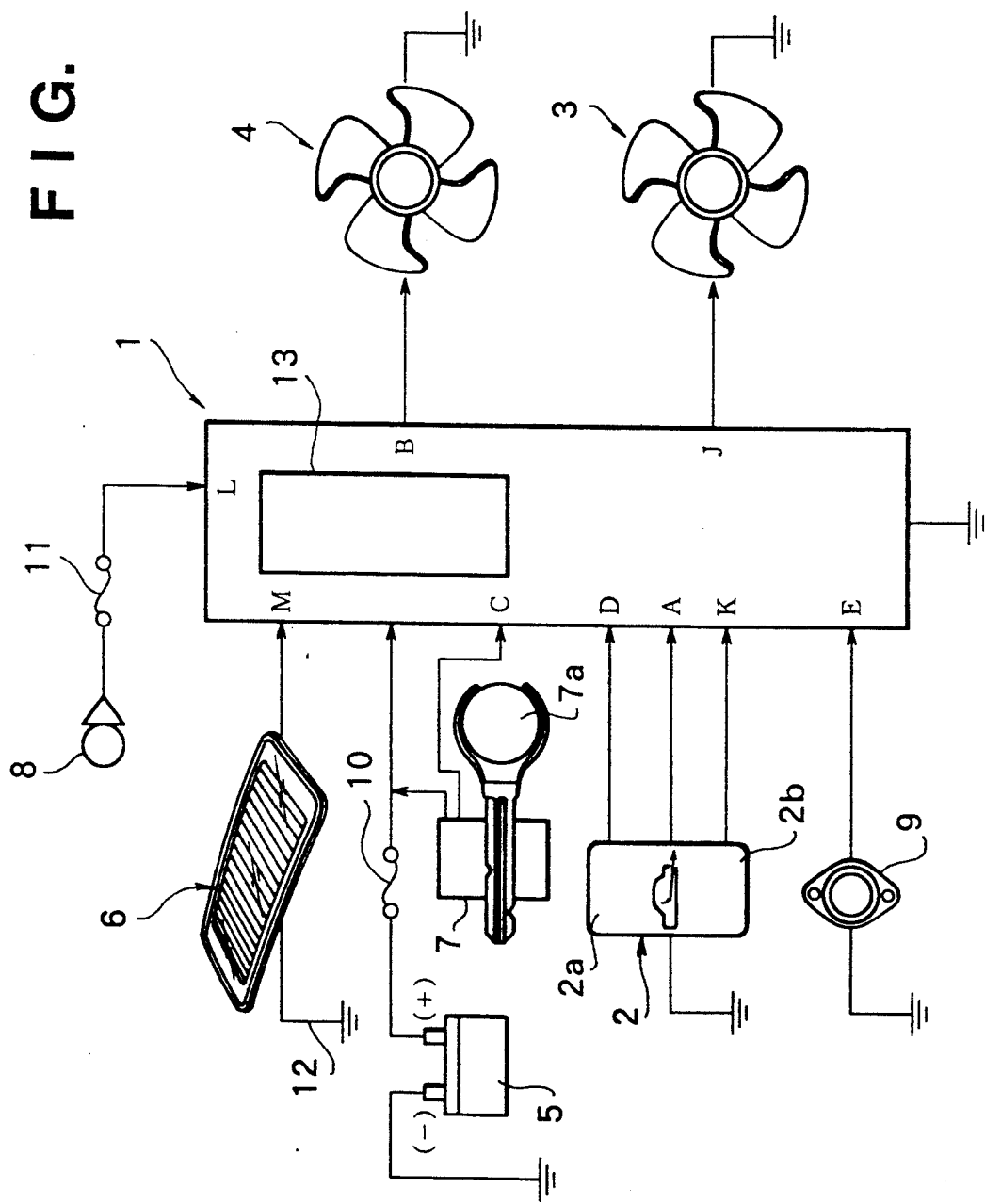
FIG. 2 is a block diagram of a control device 1.
Figure 3:
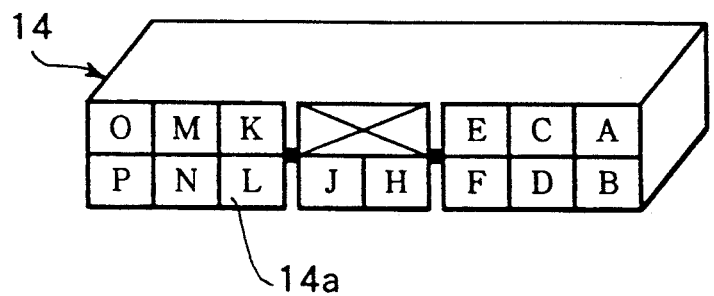
FIG. 3 is an illustration of an external view of a connector for the control device 1.

Turning to FIG. 2 which is a block diagram of the control device 1, the control device 1 includes a microprocessor 13 (hereinafter referred to as a CPU) for executing various control operations on the basis of the signals input thereto, and driving circuits which will be described later. The control device 1 is accommodated in a box shown in FIG. 1. The control device 1 is connected to the first and second ventilating fans 3 and 4 and other components through pins 14a of a connector 14 provided integrally with the control device 1 so as to facilitate assembly and maintenance. The pins 14a are arranged in the manner shown in FIG. 3.

As shown in FIG. 2, an ignition switch 8 (hereinafter referred to as an IG switch) for detecting the operation of an engine is connected to the control device 1 through a fuse for an air conditioner power source. A negative side of the aforementioned solar battery 6 is connected to a grounding conductor 12 of the car body, and a positive side thereof is connected to the control device 1. A negative side of the storage battery 5 is connected to the grounding conductor 12, and a positive side thereof is connected to the control device through a fuse 10 for an interior power source. A key detecting switch 7 for detecting the presence/absence of an engine key 7a used to operate the IG switch 8 is connected to a line which connects the control device 1 and to the positive side of the storage battery 5.

The operation switch 2 is connected to the grounding conductor 12. Individual signal lines which respectively indicate the operated states of the operation switch 2 are connected to the control device 1. A temperature sensor 9 is provided integrally with the first ventilating fan 3. The temperature sensor 9 is connected to the control device 1 so that the results of the detection of the temperature of the air can be input to the control device 1 so as to allow controls which will be described later to be executed.

Figure 4:
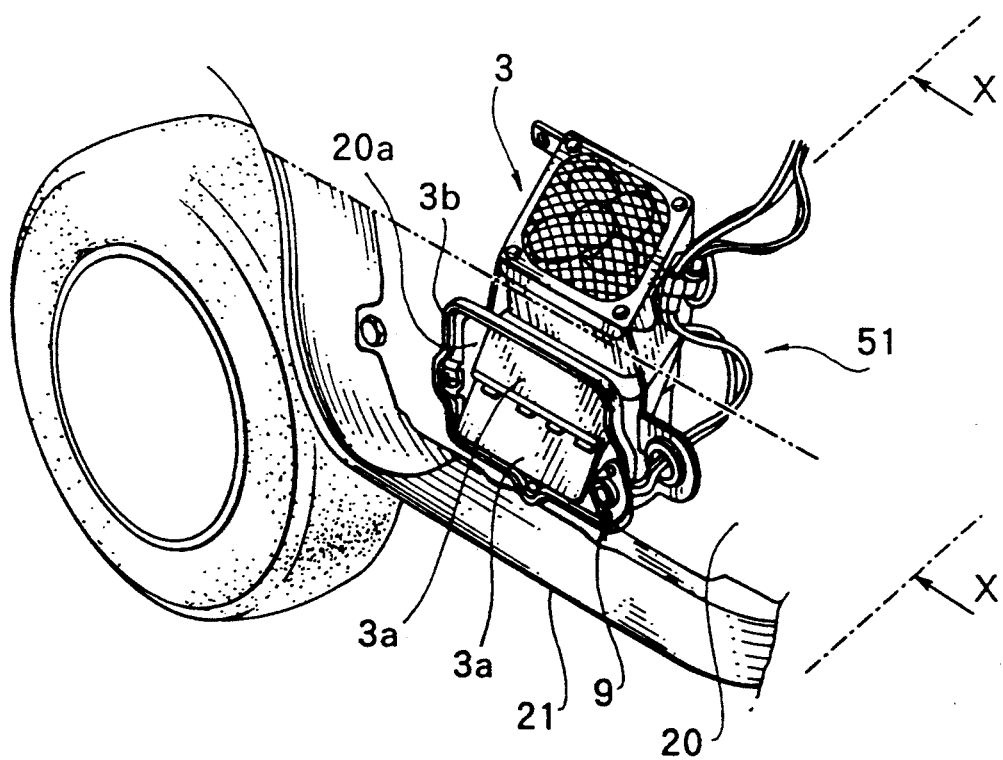
FIG. 4 illustrates how a first ventilating fan 3 is mounted.
Figure 5A:
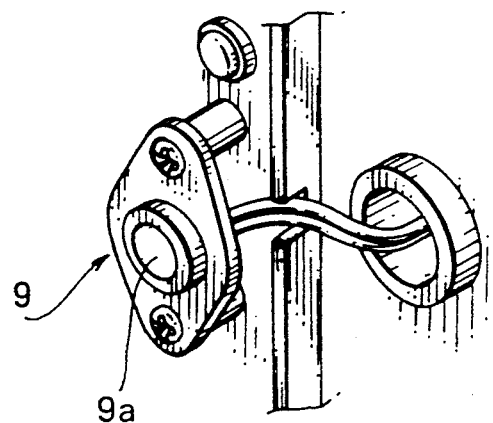
FIG. 5A shows an external view of a temperature sensor 9 in an enlarged fashion.
Figure 5B:
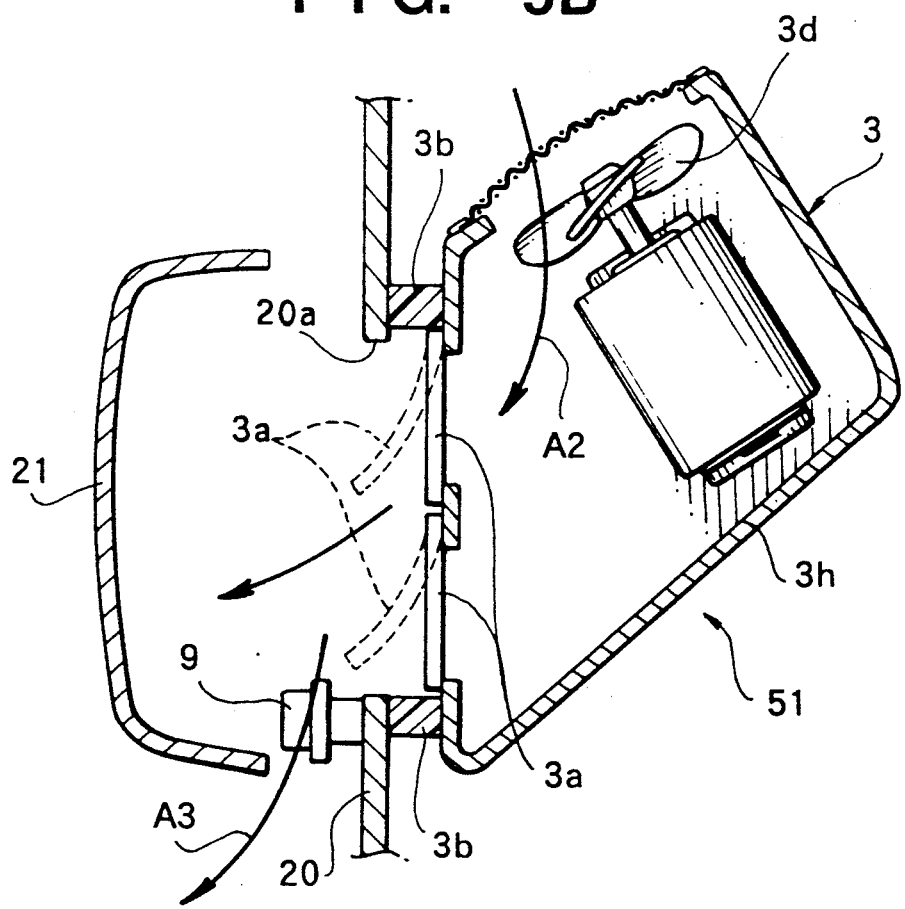
FIG. 5B is a cross-section taken along a line X—X of FIG. 4.

FIG. 4 shows an external view of the first ventilating fan 3, FIG. 5A is an enlarged view of the temperature sensor 9, and FIG. 5B is a section taken along a line X—X of FIG. 4. Referring first to FIG. 4, the first and second ventilating fans 3 and 4 have substantially the same structure with the exception that the second ventilating fan 4 has the temperature sensor 9, and are mounted in the same manner.

As shown in FIG. 4, the first ventilating fan 3 is fixed to a side panel 20 with a sponge rubber-like sealing member 3b therebetween. The sealing member 3b hermetically seals the periphery of an opening 20a formed in the lower portion of the side panel 20 of the trunk 51. The temperature sensor 9 is fixed in the vicinity of the opening 20a such that a sensor portion 9a thereof is directed outward, as shown in FIG. 5A, so as to detect the temperature around the rear side of the bumper 21. Lids 3a made of rubber are provided in two stages at an exhaust outlet portion of the ventilating fan 3. The upper edge portion of each of the lids 3a is supported such that the lid can be automatically opened and closed in accordance with the drive of the ventilating fan 3.

When the ventilating fan 3 or 4 is driven, each of the lids 3a is moved to a position indicated by a broken line due to the air pressure, as shown in FIG. 5B, and the exhaust air A3 is thereby discharged to the outside from between the rear side of the bumper 21 and the side panel 20. When the drive of the ventilating fan 3 or 4 is stopped, the lid 3a made of rubber returns to the position indicated by the solid line due to its own weight and elasticity, and thereby prevents the air or rain drops from flowing into the trunk 51.

Since the side panel 20 in which the opening 20a is formed is located at the rear of the bumper 21, the appearance of the vehicle is not spoiled, and the lids 3a are not directly exposed to the wind or rain. Also, the temperature sensor 9 may not be soiled.

The ventilating fans connected to the control device and provided within the trunk are driven in accordance with the operated state of the operation switch 2, the presence or absence of the IG switch 8, the state of the air and the open-circuit voltage of the solar battery by the control device which automatically sets the operation mode of the ventilating fans.

Figure 7A:
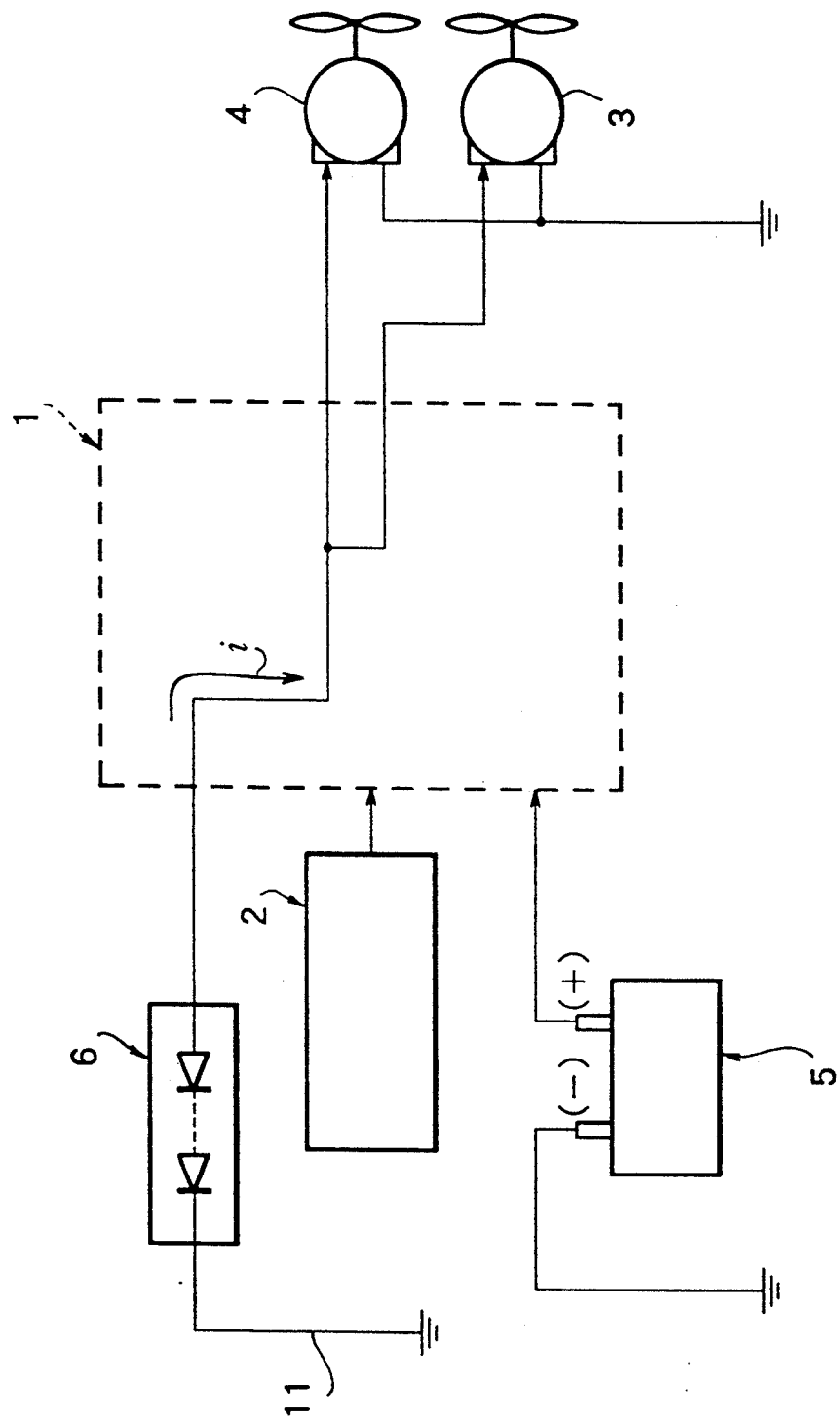
FIG. 7A is a block diagram showing parking ventilation mode in the table shown in FIG. 6.

Turning to FIGS. 6, 7A through 7C, when the operation switch 2 is positioned to the forced ventilation side during the operation of the engine, the forced ventilation mode shown in FIG. 7B is set, and the ventilating fans 3 and 4 are driven in that mode. When the operation switch 2 is pressed to the forced ventilation side 2a while the engine is at a stop, the charging mode shown in FIG. 7C is set, and charging from the solar battery is thereby performed.

When the operation switch 2 located at the neutral off position is changed over to the forced ventilation position while the engine is operating, forced ventilation is conducted for ten minutes by the action of a power source timer. When the operation switch 2 is located at the neutral off position while the engine is at a stop, the charging mode shown in FIG. 7C is set.

When the IG key 7a is inserted although the engine is at a stop and when the operation switch 2 is locked to the parking ventilation side, the charging mode is obtained. When the driver removes the IG key 7a and then gets out of the car after he or she stops the engine, and when the temperature of the air is 7° C. or below, the preliminary ventilating device is operated in the charging mode.

When the driver removes the IG key 7a and then gets out of the car after he or she stops the engine, and when the temperature of the air is between 7° C. and 15° C., the preliminary ventilating device is operated in the charging mode or parking ventilation mode. When the driver removes the IG key 7a and then gets out of the car after he or she stops the engine, and when the temperature of the air is 15° C. or above, the preliminary ventilating device is operated in the parking ventilation mode shown in FIG. 7A.

Figure 8:
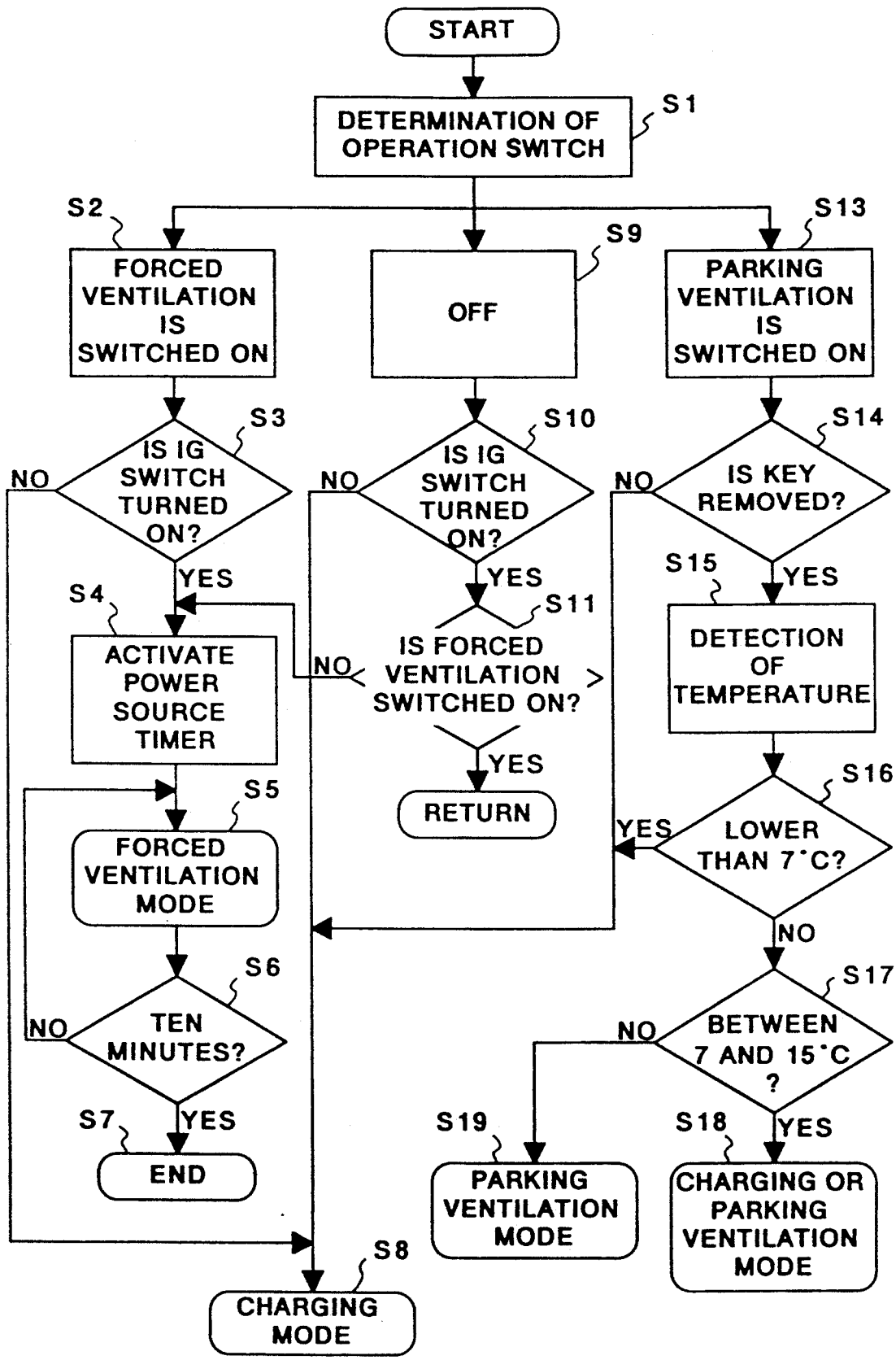
FIG. 8 is a flowchart of the control operation for setting the operation mode.

The aforementioned automatic mode setting is performed on the basis of the control flowchart shown in FIG. 8 by the CPU 13 incorporated in the control device 1. More specifically, after the operation of the control device 1 having the configuration shown in FIG. 2 is initiated, the operated state of the operation switch 2 is determined in step S1. If the operation switch 2 is located at the forced ventilation position, the process goes to step S2. Thereafter, it is determined in step S3 whether or not the IG switch 8 is turned on and the engine is thereby operated. If it is determined that the engine is at a stop, the process goes to step S8 and the charging mode is set. If it is determined in step S3 that the IG switch 8 is turned on and the engine is running, the power source timer is activated in step S4, and then the forced ventilation mode is set to drive the ventilation fans in step S5. Thereafter, it is determined in step S6 whether or not about ten minutes has elapsed since the power source timer is activated. If the answer is yes, drive of the ventilation fans is stopped in step S7.

If it is determined in step S1 that the operation switch 2 is located at the neural off position, the process goes to step S10, and it is determined whether or not the IG switch is turned on and the engine is thereby operating. If it is determined that the engine is at a stop, the process goes to step S8 and the charging mode is set. If it is determined in step S10 that the IG switch 8 is turned on and the engine is operating, the process goes to step S11 and it is determined whether or not the operation switch is located at the forced ventilation position. If the operation switch is located at the forced ventilation position, the process proceeds to step S4, and forced ventilation is executed for ten minutes. If it is determined in step S11 that the operation switch is not located at the forced ventilation position 2a, the process returns to the initial state in step S12.

If it is determined in step S1 that the operation switch 2 is locked to the parking ventilation position, the process goes to step S14, and it is determined whether or not the IG key 7a is inserted by means of the key detection switch 7. If it is determined that the IG key 7a is inserted, the charging mode is set in step S8. If it is determined that the IG key 7a is not inserted by means of the key detection switch 7, the process goes to step S15 and the temperature measurement is executed by means of the temperature sensor 9. At that time, if the temperature of the air is equal to or lower than, for example, 7° C., i.e., if an increase in the temperature of the air in the interior of the vehicle does not occur, the charging mode is set in step S8.

If it is determined in step S16 that the temperature of the air is equal to or higher than 7° C., the process proceeds to step S17 and it is determined whether or not the temperature of the air is between 7° C. and 15° C. If the temperature of the air is equal to or higher than 15° C., the parking ventilation mode is set in step S19. In this parking ventilation mode, power is supplied from the solar battery 6.

If it is determined in step S17 that the temperature of the air is between 7° C. and 15° C., the process goes to step S18 and either the charging mode or the parking ventilation mode is set in accordance with the amount of sunlight received by the solar battery. Thus, the control device 1 automatically sets the operation mode. Next, the operations in the charging and parking ventilation modes will be described below in detail.

Figure 9:
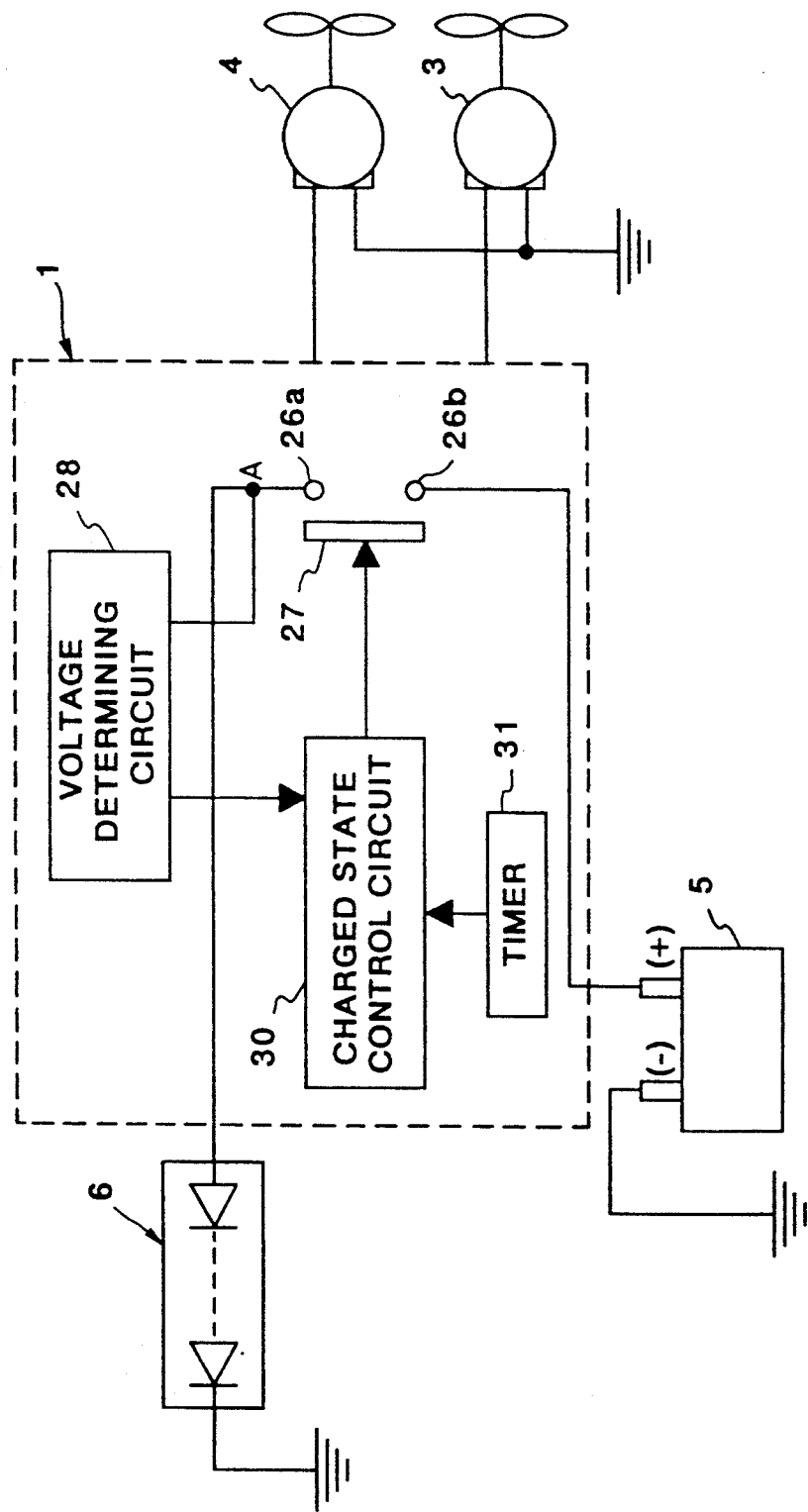
FIG. 9 is a block diagram of a structure which functions when the charging mode is set.

Referring to FIG. 9, the control device 1 has a terminal 26a which is connected to the positive side of the solar battery 6, and a terminal 26b extending to the storage battery 5. These terminals 26a and 26b are connected to each other and disconnected from each other by turning on and off a switch 27. The switch 27 is connected to a charged state control circuit 30 so that it can be turned on and off on the basis of the signal from the charged state control circuit 30. The charged state control circuit 30 is connected to a timer 31 for generating a fixed period, so that it can turn on and off the switch 27 at fixed time intervals.

A voltage determination circuit 28 for measuring the open-circuit voltage of the solar battery 6 is connected between the terminal 26a and the charged stage control circuit 30. The voltage determination circuit 28 measures the open-circuit voltage of the solar battery 6 in a state wherein the switch 27 is turned off.

Figure 10:
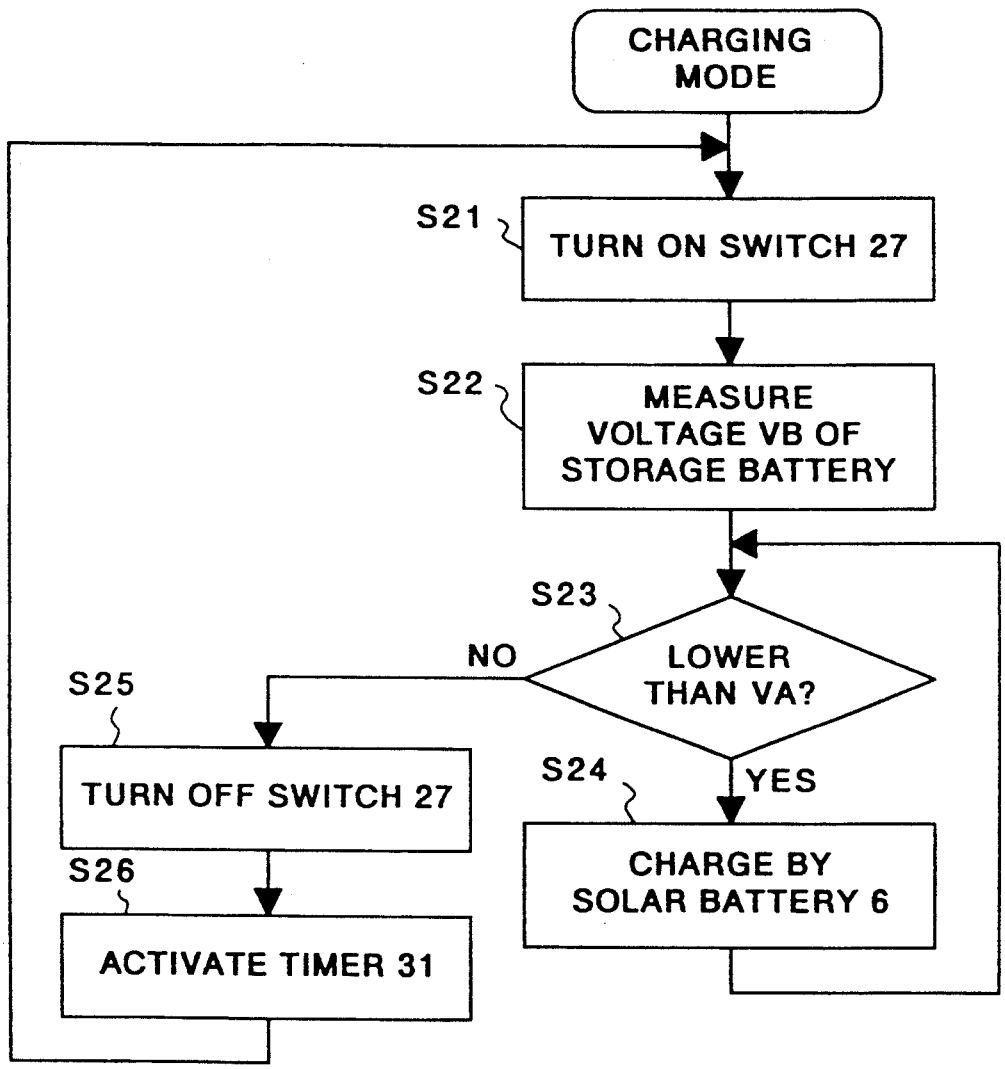
FIG. 10 is a flowchart of the control operation executed in the charging mode.
Figure 11:
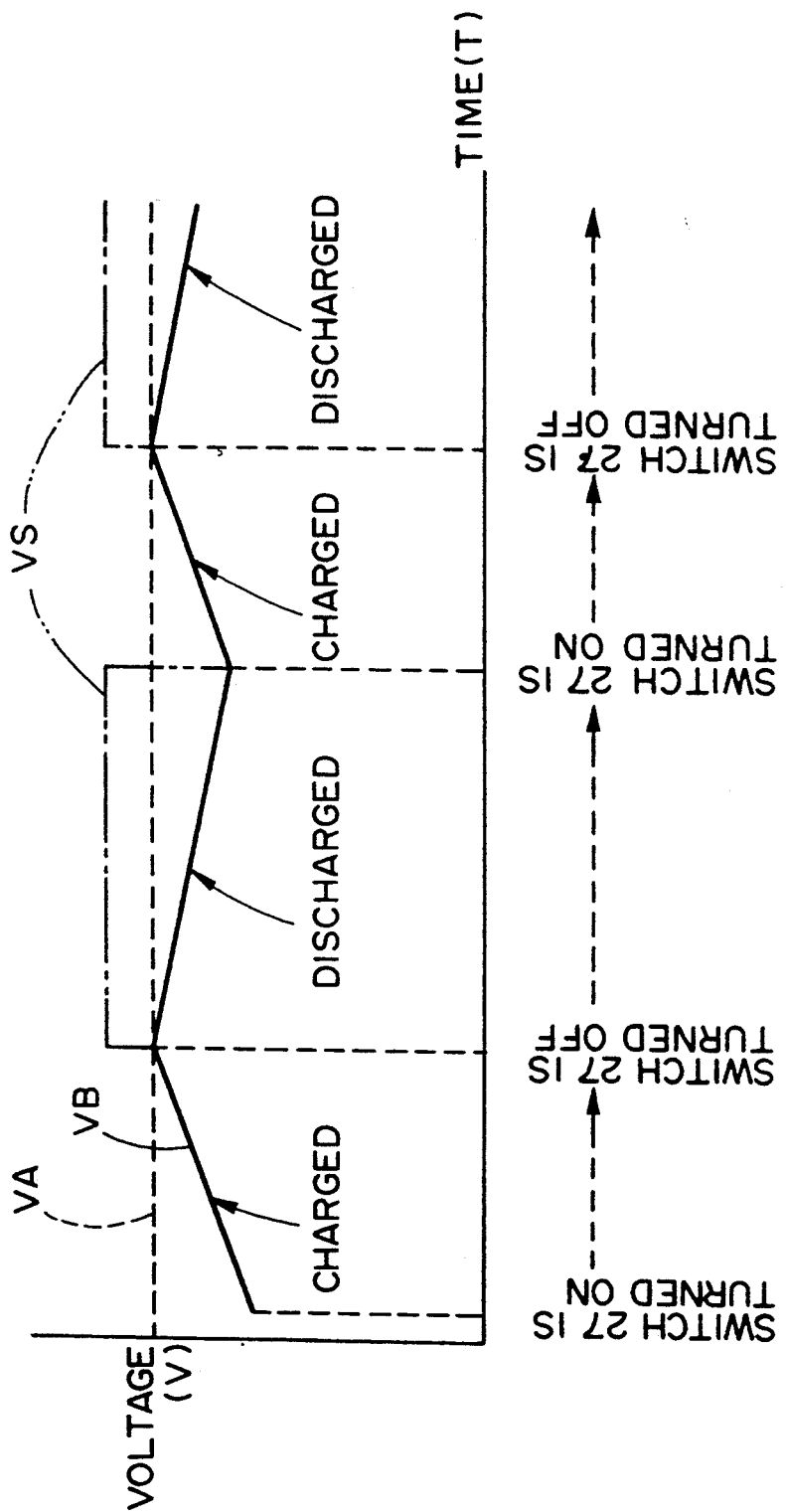
FIG. 11 illustrates the relationship between voltage VB of the storage battery, reference voltage VA and voltage VS of the solar battery in the charging mode.

FIG. 10 is a flowchart of the control operation executed in the charging mode, and FIG. 11 shows the relation between voltage VB of the storage battery, reference voltage VA and the voltage of the solar battery in the charging mode. Referring to FIGS. 9, through 11, after the operation of the control device is initiated and the charging mode is set, the charged stage control circuit 30 turns on the switch 27 in step S21, and then voltage VB of the storage battery is measured in step S22. Next, it is determined in step S23 whether or not voltage VB of the storage battery is reference voltage VA or below. If it is determined that voltage VB is less than reference voltage VA, the process goes to step S24 and charging from the solar battery 6 is performed. Charging is stopped when the storage battery is charged to reference voltage VA or above. If it is determined in step S23 that the storage battery is charged to reference voltage VA, the charged state control circuit 30 turns off the switch 27 and thereby disconnects the terminals 26.

Consequently, flow of the charging current from the solar battery to the storage battery stops. When no current flows out from the solar battery, the open-circuit voltage VS thereof rises about to 20 volts. Hence, the timer 31 is activated in step 26 so that the process can return to step S21 to turn on the switch 27 again after a predetermined period of time passes. When discharge of the storage battery is in progress, as shown in FIG. 11, after the switch 27 is turned on, charging by the solar battery is executed again. Thereafter, the storage battery is fully charged by turning on and off the switch 27 at fixed time intervals when there is sunlight.

After the storage battery is fully charged at the fixed time intervals, the switch is forcibly turned on and off to measure the voltage of the storage battery. If it is detected that the voltage is lowered to a level which requires charging, charging from the solar battery is executed.

Figure 12:
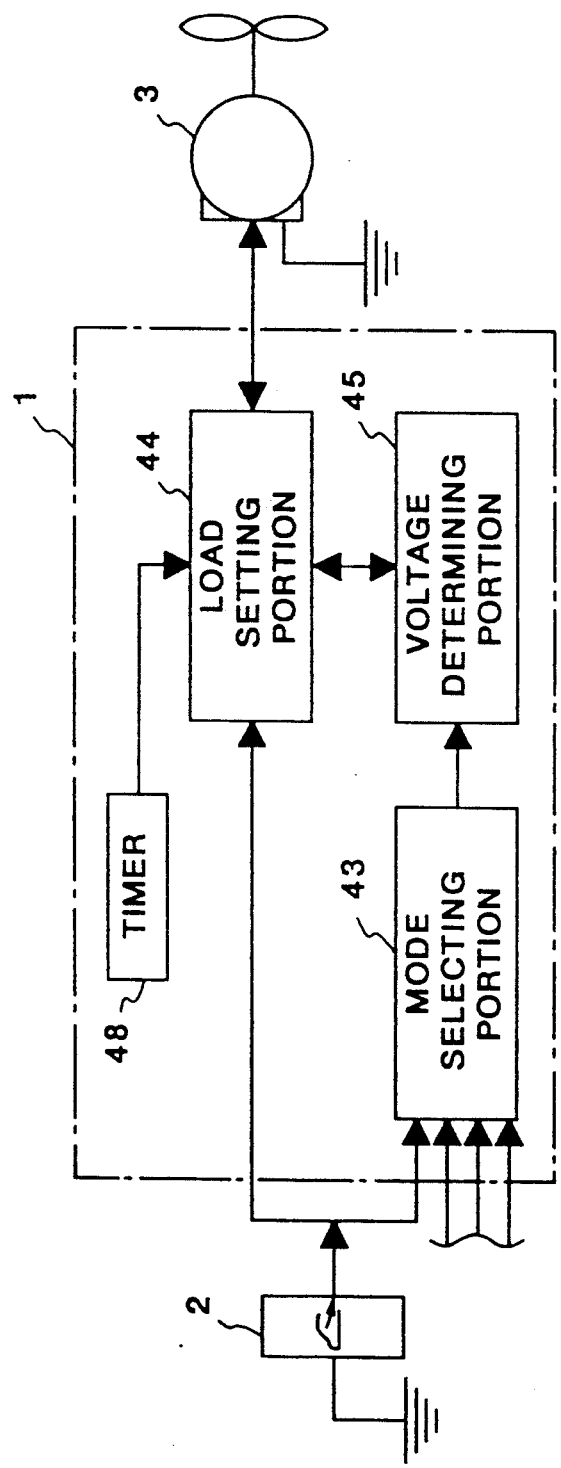
FIGS. 12 and 13 are block diagrams of the parking ventilation mode.

How the ventilating fans are driven in the parking ventilation mode will be described below with reference to FIGS. 12 and 13. Referring first to FIG. 12, a mode selecting portion 43 selects the operation mode from among the ventilation mode, the forced ventilation mode and the charging mode, and a voltage determining portion 45 makes a determination whether or not a voltage sufficient to activate the ventilating fans 3 and 4 is sent out from the solar battery 6 when the ventilation mode is selected by the mode selecting portion 43. A load setting portion 44 connects the ventilating fan 3 which is a predetermined load to the solar battery 6 and measures $\Delta v$ (FIG. 15) when the voltage determining portion 45 makes a determination of the output voltage. The load setting portion 44 also acts as switch means for starting energization to a fan motor 11 when the voltage determining portion 45 determines that the voltage output from the solar battery 3 is high enough to activate the fan motor 11.

Figure 13:
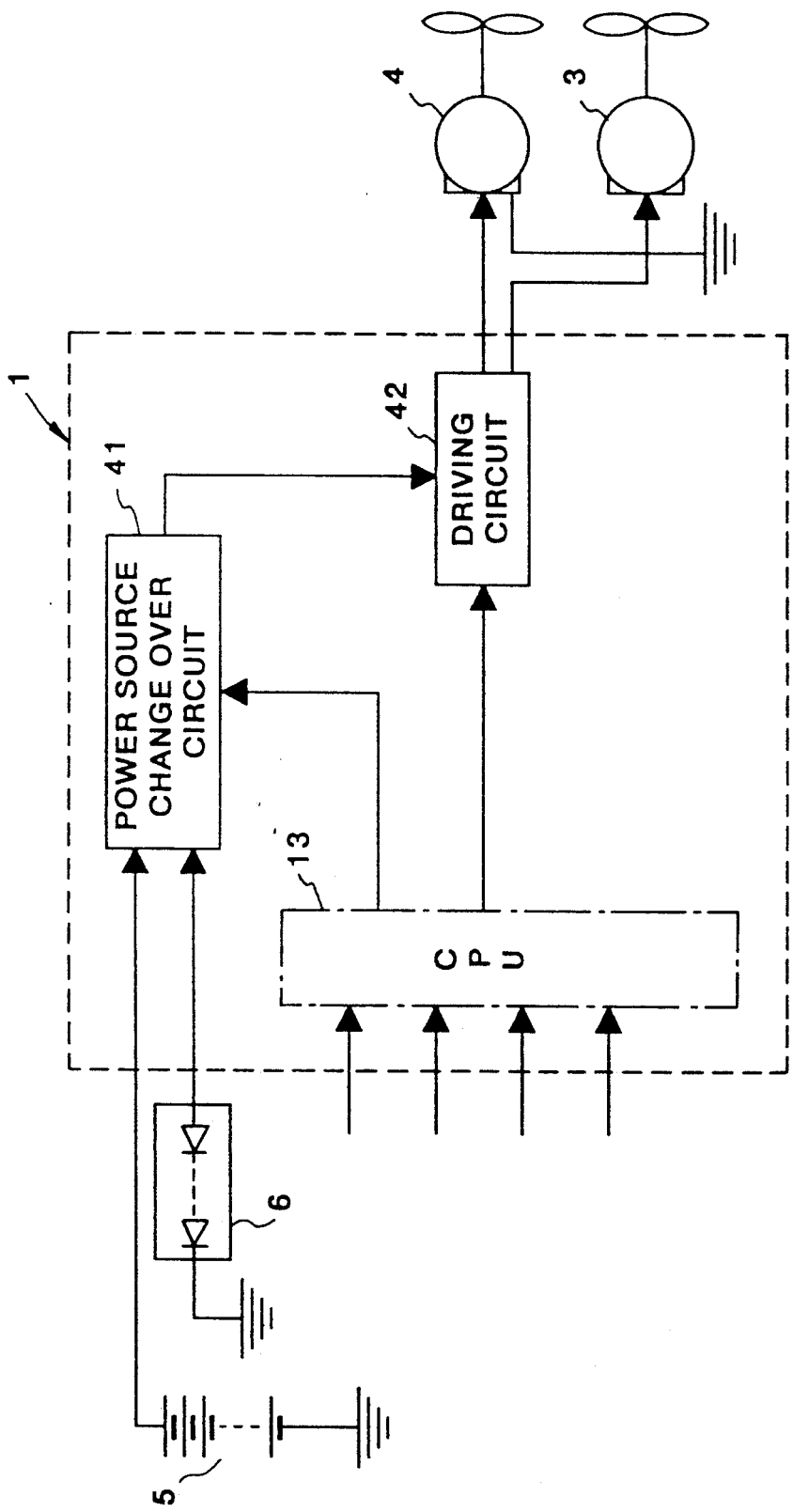

Turning to FIG. 13, the CPU 13 is connected to a power source change-over circuit 41 and to a driving circuit 42 for driving the ventilating fans 3 and 4. The power source change-over circuit 41 is in turn connected to the storage battery 5 and to the solar battery 6 so that power can be supplied from either the storage battery 5 or the solar battery 6 to the driving circuit 42 to drive the ventilating fans.

Figure 14:
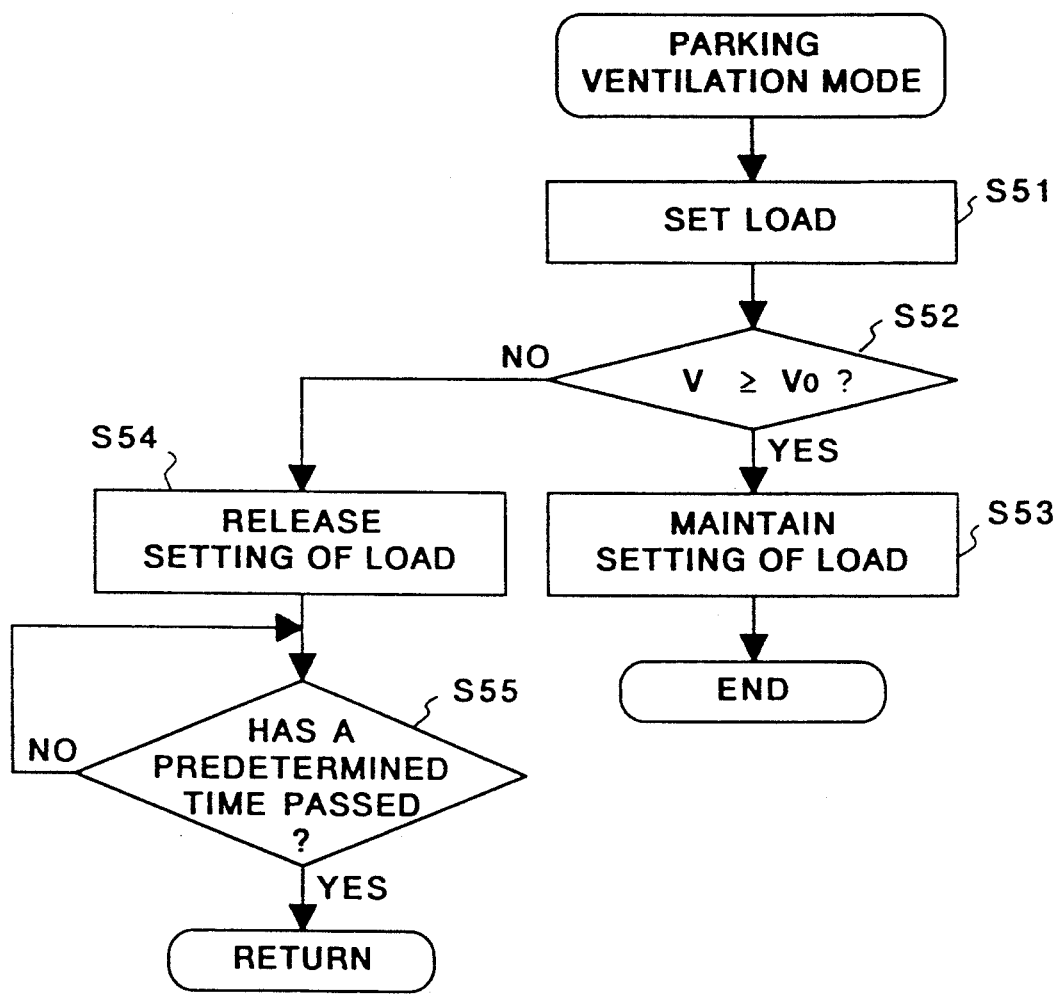
FIG. 14 is a flowchart of the control operation executed in the parking ventilation mode.

FIG. 14 is a flowchart of the control operation executed in the parking ventilation mode. The following example shows the case in which a d.c. motor serving as the driving means of the ventilating fans is activated by a solar battery exhibiting the voltage current curve Y lower than the reference voltage current curve X when an amount of sunlight assuring the reference voltage and current curve X is obtained.

Figure 15:
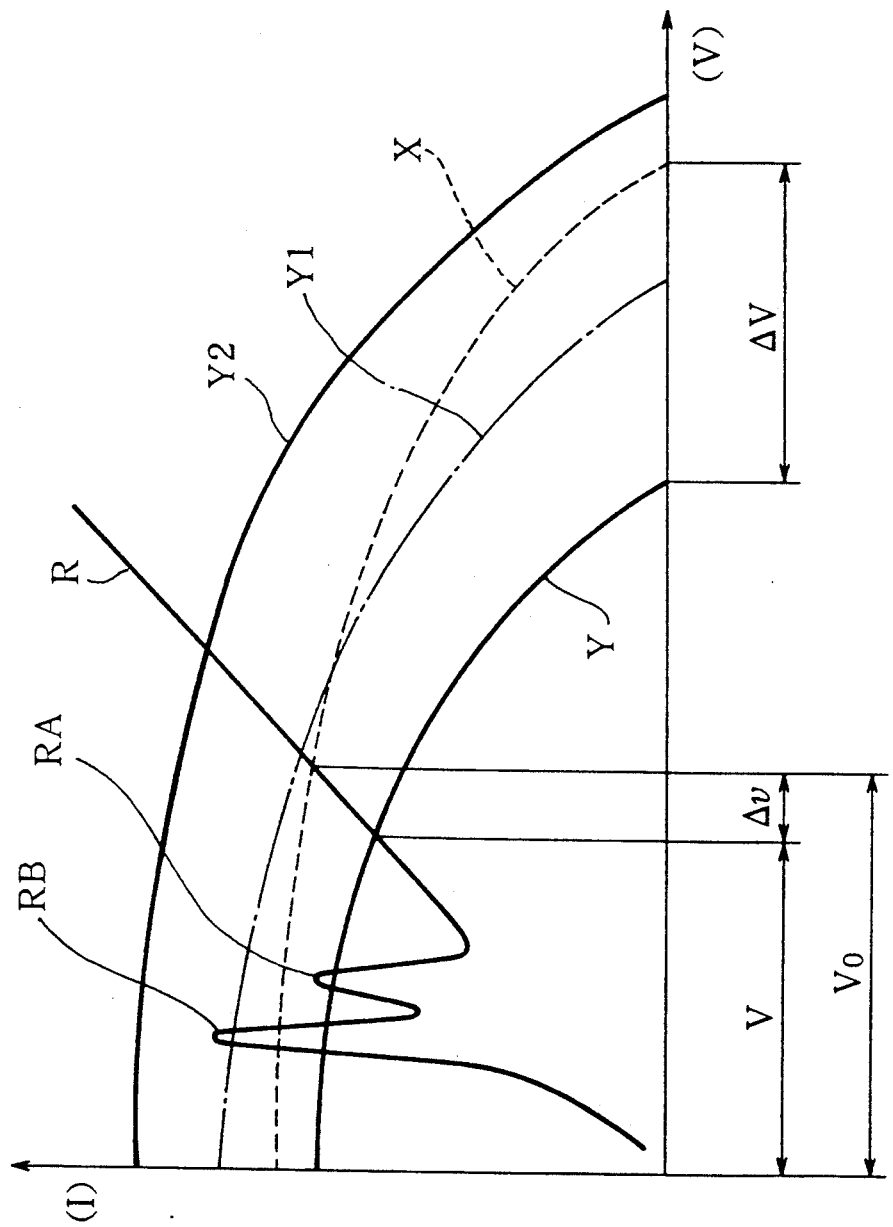
FIG. 15 illustrates the relationship between activation characteristic curve R of a d.c. motor, reference voltage current curve X of a reference solar battery, and voltage current curve Y of an individual solar battery.

Referring to FIGS. 14, 15 and 12, when the voltage current curve Y of the solar cell which is lower than the reference voltage current curve X is obtained after the parking ventilation mode is set, the load setting portion 44 connects the ventilating fan load to the solar cell 5 in step S51. Thereafter, in step S52, the voltage determining portion 45 compares the output voltage V of the solar cell 6 when the fans are connected to the solar cell with voltage $V_0$ set beforehand from the reference voltage current curve X as the voltage sufficient to activate the ventilating fans.

If it is determined in step S52 that $V \geq V_0$, the process goes to step S53, and connection between the solar cell 6 and the ventilating fans is maintained and the ventilating fans are activated.

If it is determined in step S52 that $V \geq V_0$, the process goes to step S54, and connection between the solar cell 6 and the ventilating fans is released. Thereafter, in step S55, passage of a predetermined period of time is awaited, and then the process returns to step S51. Thereafter, the aforementioned steps are repeated.

Since the ventilating fans are driven after the solar cell 6 is connected to the ventilating fans, they can be activated even when the amount of sunlight irradiating the solar cell is not large as compared with the method in which after the load is connected to the solar cell and a difference $\Delta v$ between reference voltage current curve X and voltage current curve Y is measured, the state of voltage current curve Y2 at which an open-circuit voltage higher than the reference voltage current curve by $\Delta v$ can be generated is awaited, and the motor is activated the moment when activation characteristic curve R reaches voltage current curve Y2.

That is, the state exhibiting voltage current curve Y1 of the solar cell, indicated by the alternate long and short dash line in FIG. 15, is obtained. An electromotive force generated in this state is higher than that of voltage current curve Y, 30 mW/cm$^2$, by 5 mW/cm$^2$.

It is to be understood that the form of the present invention herein shown and described is to be taken as a preferred example of the same and that various changes may be resorted to without departing from the spirit and scope of the invention.

As will be understood from the foregoing description, in the preliminary ventilating device for vehicles according to the present invention in which the storage battery is charged on the basis of the results of the measurement of the open-circuit voltage of the solar cell and the ventilating fans are driven, when the voltage of the storage battery drops to a level at which the storage battery can be charged from the solar cell and when the open-circuit voltage of the solar cell is at a level at which it can charge the storage battery, charging control of the storage battery can be performed on the basis of the results of the measurement of the open-circuit voltage of the solar cell.

In the preliminary ventilating device for vehicles in which the storage battery is charged on the basis of the results of the measurement of the open-circuit voltage of the solar cell and the ventilating fans are driven, in a case where the voltage current curve of the solar cell is lower than the reference curve, even when the amount of sunlight irradiating the solar cell does not reach the maximum value, the ventilating fans can be activated.

The present invention is not limited to the above embodiments and various changes and modifications can be made within the spirit and scope of the present invention. Therefore, to apprise the public of the scope of the present invention the following claims are made.

What is claimed is:

1. A preliminary ventilating device for a vehicle, said device having a control device connected to a solar battery, a storage battery, an operation means and a ventilation means; said preliminary ventilating device being set by a change-over operation of said operation means to either of charging mode in which said storage battery is charged from said solar battery, forced exhaust mode in which said ventilation means is driven by power supplied from said storage battery, and in parking ventilating mode in which said ventilation means is driven by an electromotive force supplied from said solar battery, said device comprising:
    a voltage measurement means for measuring an open-circuit voltage of said solar battery and a discharge voltage of said storage battery;
    a switch means for switching on and off charging of said storage battery from said solar battery; and
    a first timer means for switching on and off said switch means at predetermined time intervals;
    wherein in the charging mode, said switch means is switched on and off at the predetermined time intervals to adequately perform charging of said storage battery from said solar battery.

2. A preliminary ventilating device for a vehicle according to claim 1, wherein said vehicle comprises a passenger car having at least roof portion, and wherein said solar battery comprises an amorphous silicon solar battery which is disposed on said roof portion.

3. A preliminary ventilating device for a vehicle according to claim 1, wherein said solar battery exhibits a suitable transparency, and also serves as a window member for a sun roof which can be opened and closed.

4. A preliminary ventilating device for a vehicle according to claim 1, wherein said vehicle comprises a passenger car having at least a trunk, and wherein said control device is contained in a box container in a state wherein it is connected to said solar battery, said storage battery, said operation means and said ventilation means, said box container being disposed in said trunk.

5. A preliminary ventilating device for a vehicle according to claim 1, wherein said operation means is disposed at a position where it can readily be operated from a driver's seat.

6. A preliminary ventilating device for a vehicle, said device having a control device connected to a solar battery, a storage battery, an operation means and a ventilation means; said preliminary ventilating device being set by a change-over operation of said operation means to either of charging mode in which said storage battery is charged from said solar battery, forced exhaust mode in which said ventilation means is driven by power supplied from said storage battery, and in parking ventilating mode in which said ventilation means is driven by an electromotive force supplied from said solar battery, said device comprising:
    an open-circuit voltage determination means for measuring an open-circuit voltage of the solar battery;
    a load setting means for connecting a predetermined load means to said solar battery when said voltage determination means measures the open-circuit voltage;
    a timer means for controlling the connection at predetermined time intervals; and
    a determination means for making a determination whether the open-circuit voltage of the solar battery is high enough to activate said ventilation means on the basis of the results of the measurement of the open-circuit voltage of the solar battery which is performed after said load setting means makes the connection, wherein in the parking ventilation mode, said ventilation means is activated by power supplied from the solar battery on the basis of the results of the determination.

7. A preliminary ventilating device for a vehicle according to claim 6, wherein said load means comprises a d.c. motor for driving a ventilating fan used in said ventilation means.

8. A preliminary ventilating device for a vehicle according to claim 6, wherein said vehicle comprises a passenger car having at least roof portion, and wherein said solar battery comprises an amorphous silicon solar battery which is disposed on said roof portion.

9. A preliminary ventilating device for a vehicle according to claim 6, wherein said solar battery exhibits a suitable transparency, and also serves as a window member for a sun roof which can be opened and closed.

10. A preliminary ventilating device for a vehicle according to claim 6, wherein said vehicle comprises a passenger car having at least a trunk, wherein said control device is contained in a box container, said box container being disposed in said trunk, wherein a pair of ventilating fans constituting said ventilation means are disposed at two side walls of said trunk in a state wherein said ventilating fans communicate with an interior of the vehicle, and wherein said control device is connected to said solar battery, said storage battery, said operation means and said ventilation means.

11. A preliminary ventilating device for a vehicle according to claim 6, wherein said operation means is disposed at a position where it can readily be operated from a driver's seat.

12. A preliminary ventilating device for a vehicle, said device having a control device connected to a solar battery, a storage battery, an operation means and a ventilation means; said preliminary ventilating device being set by a change-over operation of said operation means to either of charging mode in which said storage battery is charged from said solar battery, forced exhaust mode in which said ventilation means is driven by power supplied from said storage battery, and in parking ventilating mode in which said ventilation means is driven by an electromotive force supplied from said solar battery, said device comprising:

a voltage measurement means for measuring an open-circuit voltage of said solar battery and a discharge voltage of said storage battery;

a switch means for switching on and off charging of said storage battery from said solar battery;

a first timer means for switching on and off said switch means at predetermined time intervals, said switch means being switched on and off at the predetermined time intervals to adequately perform charging of said storage battery from said solar battery when the charging mode is set;

an open-circuit voltage determination means for measuring an open-circuit voltage of the solar battery;

a load setting means for connecting a predetermined load means to said solar battery when said voltage determination means measures the open-circuit voltage;

a second timer means for controlling the connection at predetermined time intervals; and a determination means for making a determination whether the open-circuit voltage of the solar battery is high enough to activate said ventilation means on the basis of the results of the measurement of the open-circuit voltage of the solar battery which is performed after said load setting means makes the connection, said ventilation means being activated by power supplied from the solar battery on the basis of the results of the determination in the parking ventilation mode.

13. A preliminary ventilating device for a vehicle according to claim 12, wherein said vehicle comprises a passenger car having at least roof portion, and wherein said solar battery comprises an amorphous silicon solar battery which is disposed on said roof portion.

14. A preliminary ventilating device for a vehicle according to claim 12, wherein said solar battery exhibits a suitable transparency, and also serves as a window member for a sun roof which can be opened and closed.

15. A preliminary ventilating device for a vehicle according to claim 12, wherein said vehicle comprises a passenger car having at least a trunk, wherein said control device is contained in a box container, said box container being disposed in said trunk, wherein a pair of ventilating fans constituting said ventilation means are disposed at two side walls of said trunk in a state wherein said ventilating fans communicate with an interior of the vehicle, and wherein said control device is connected to said solar battery, said storage battery, said operation means and said ventilation means.

16. A preliminary ventilating device for a vehicle according to claim 12, wherein said operation means is disposed at a position where it can readily be operated from a driver's seat.

* * * * *

UNITED STATES PATENT AND TRADEMARK OFFICE
CERTIFICATE OF CORRECTION

PATENT NO. : 5,167,573

DATED : December 1, 1992

INVENTOR(S) : Kanno et al.

It is certified that error appears in the above-identified patent and that said Letters Patent is hereby corrected as shown below:

On the title page: Item

[30] Foreign Application Priority Data

November 30, 1990 [JP]  Japan....... 2-340095
    January 31, 1991 [JP]   Japan....... 3-011101
    November 13, 1991 [JP]  Japan....... 3-297044

Col. 2, line 45, "curve curve X" should be --current curve X--;

Col. 9, line 12, "$V \geq V_0$" should be --$V<V_0$--.

Signed and Sealed this

Eighteenth Day of January, 1994

Attest:

BRUCE LEHMAN

*Attesting Officer*     Commissioner of Patents and Trademarks